US008627071B1

(12) United States Patent
Corbett

(10) Patent No.: US 8,627,071 B1
(45) Date of Patent: Jan. 7, 2014

(54) INSURING INTEGRITY OF REMOTE PROCEDURE CALLS USED IN A CLIENT AND SERVER STORAGE SYSTEM

(75) Inventor: Peter F. Corbett, Lexington, MA (US)

(73) Assignee: NetApp, Inc., Sunnyvale, CA (US)

( * ) Notice: Subject to any disclaimer, the term of this patent is extended or adjusted under 35 U.S.C. 154(b) by 1775 days.

(21) Appl. No.: 11/118,665

(22) Filed: Apr. 29, 2005

(51) Int. Cl.
*H04L 9/32* (2006.01)

(52) U.S. Cl.
USPC .......................................................... 713/168

(58) Field of Classification Search
USPC .................................. 713/181, 168, 170, 179
See application file for complete search history.

(56) References Cited

U.S. PATENT DOCUMENTS

| 5,778,228 | A  | * | 7/1998  | Wei ............................. 719/328 |
| 6,671,773 | B2 |   | 12/2003 | Kazar |
| 6,959,384 | B1 | * | 10/2005 | Serret-Avila .................. 713/176 |
| 2004/0015724 | A1 | * | 1/2004 | Pham et al. ................... 713/201 |
| 2004/0078568 | A1 | * | 4/2004 | Pham et al. ................... 713/165 |
| 2004/0098599 | A1 | * | 5/2004 | Bentley ......................... 713/187 |
| 2004/0139167 | A1 |   | 7/2004 | Edsall et al. |

FOREIGN PATENT DOCUMENTS

| JP | 10003440 A | 6/1998 |
| WO | WO 00/07101 A1 | 2/2000 |

OTHER PUBLICATIONS

Atomic Remote Procedure Call by Kwei-Jay Lin and John D. Gannon published by IEEE 1985.*
Eisler, M. Request for Comments 2203, entitled "RPCSEC_GSS Protocol Specification" Sep. 1997.
Linn, J. Request for Comments 2078, entitled "Generic Services Generic Security Service Application Program Interface, Version 2." OpenVision Technologies, Jan. 1997.
Srinivasan R.; Request for Comments 1831, entitled "RPC: Remote Procedure Call Protocol Specification Version 2" Sun Microsystems, Aug. 1995.
Tanenbaum, Andrew S.; *Computer Networks* $3^{rd}$ *Edition*; Prentice Hall, 1996. pp. 521-542.

* cited by examiner

*Primary Examiner* — Ellen Tran
(74) *Attorney, Agent, or Firm* — Cesari and McKenna, LLP

(57) ABSTRACT

A system and method generates a message integrity check. The message integrity check value is computed by hashing one or more block checksums from procedure specific parameters of an RPC and then encrypting the resulting hash value. The one or more block checksums may be quickly computed using conventional data checksumming procedures for the data contained within the RPC. As such, the computations to hash the block checksums is minimal. The computed message integrity check is appended to the RPC to thereby provide a level of security approaching or equal to the level of Integrity defined by the RPCSEC_GSS protocol specification.

21 Claims, 10 Drawing Sheets

INSURING INTEGRITY OF REMOTE PROCEDURE CALLS USED IN A CLIENT AND SERVER STORAGE SYSTEM

FIELD OF THE INVENTION

The present invention is directed to network protocols and, in particular, to a technique for providing a message integrity check for data transmissions.

BACKGROUND OF THE INVENTION

A storage system typically comprises one or more storage devices into which information may be entered, and from which information may be obtained, as desired. The storage system includes a storage operating system that functionally organizes the system to by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage system may be further configured to operate according to a client/server model of information delivery to thereby allow many clients to access data containers, such as files and logical units, stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

A plurality of storage systems may be interconnected to provide a storage system cluster configured to service many clients. Each storage system or node may be configured to service one or more volumes, wherein each volume stores one or more data containers. Communication among the nodes involves the exchange of information between two or more entities interconnected by communication links. These entities are typically software programs executing on the nodes. The nodes communicate by exchanging discrete packets or messages of information according to predefined protocols. In this context, a protocol consists of a set of rules defining how the nodes interact with each other.

Each node generally provides its services through the execution of software modules, such as processes. A process is a software program that is defined by a memory address space. For example, an operating system of the node may be implemented as a single process with a large memory address space, wherein pieces of code within the process is provide operating system services, such as process management. Yet, the node's services may also be implemented as separately-scheduled processes in distinct, protected address spaces. These separate processes, each with its own process address space, execute on the node to manage resources internal to the node and, in the case of a database or network protocol, to interact with users.

Services that are part of the same process address space communicate by accessing the same memory space. That is, information exchanged between services implemented in the same process address space is not transferred, but rather may be accessed in a common memory. However, communication among services that are implemented as separate processes is typically effected by the exchange of messages. For example, information exchanged between different addresses spaces of processes is transferred as one or messages between different memory spaces of the processes. A known message-passing mechanism provided by an operating system to transfer information between process address spaces is the Inter Process Communication (IPC) mechanism.

Resources internal to the node may include communication resources that enable a process on one node to communicate over the communication links or network with another process on a different node. The communication resources include the allocation of memory and data structures, such as messages, as well as a network protocol stack. The network protocol stack, in turn, comprises layers of software, such as a session layer, a transport layer and a network layer. The Internet protocol (IP) is a network layer protocol that provides network addressing between nodes, whereas the transport layer provides a port service that identifies each process executing on the nodes and creates a connection between those processes that indicate a willingness to communicate. Examples of conventional transport layer protocols include the reliable connection (RC) protocol and the Transmission Control Protocol (TCP).

Broadly stated, the connection provided by the transport layer, such as TCP, is a reliable, securable logical circuit between pairs of processes. A TCP process executing on each node establishes the TCP connection in accordance with a conventional "3-way handshake" arrangement involving the exchange of TCP message or segment data structures. The resulting TCP connection is identified by port numbers and IP addresses of the nodes. The TCP transport service provides reliable delivery of a message using a TCP transport header. The TCP protocol and establishment of a TCP connection are described in *Computer Networks, 3rd Edition*, particularly at pgs. 521-542, which is hereby incorporated by reference as though fully set forth herein.

Messages passed between nodes of a cluster are typically implemented as remote procedure calls (RPCs). One format for RPCs is defined in Request for Comments 1831, entitled *RPC: Remote Procedure Call Protocol Specification Version 2* by R. Srinivasan dated August 1995, the contents of which are hereby incorporated by reference. Generally a RPC comprises a header portion and a set of procedure specific parameters. The procedure specific parameters may include a set of control information and data associated with the message.

In systems using RPCs, it is desirous that data is secure and not vulnerable to a network security attack. The Generic Security Service application program interface (GSS-API), described in Request for Comments 2078, entitled *Generic Security Service Application Program Interface, Version 2*, by J. Linn dated January 1997, the contents of which are hereby incorporated by reference, provides a set of security services in a generic fashion for a variety of transport mechanisms. The GSS-API defines its services and primitives independently of the underlying transport mechanism and/or programming language environment.

To utilize the GSS-API within a RPC protocol environment, the RPCSEC_GSS protocol, defined in Request for Comments 2203, entitled *RPCSEC_GSS Protocol Specification*, by M. Eisler dated September 1997 and hereby incorporated by reference, is to typically employed. The RPC- SEC_GSS protocol defines a variety of levels of protection including an Authentication level and an Integrity level. In the Authentication level, the credential within a message is hashed and then encrypted to form an Authentication verifier. In the Integrity level, a hash is executed over the procedure specific parameters contained within a RPC and the resulting hash value is encrypted to produce a message verifier, which is then appended to the RPC.

However, a disadvantage associated with both of these protection levels involves the computational overhead required to perform the necessary calculation. For example, the entire procedure specific parameters section, including any data contained therein, must be hashed in the Integrity level. This introduces substantial overhead in terms of time as well as a concomitant reduction in available processing resources for performing other tasks. Moreover, this additional overhead may result in additional latency when retrieving data in a storage system environment.

SUMMARY OF THE INVENTION

The present invention overcomes the disadvantages of the prior art by providing a system and method for generating a message integrity check for use in a data transmissions, including, e.g., remote procedure call (RPC) based network protocols executing on storage systems or nodes of a cluster. Each node is generally organized as a network element (N-blade) and a disk element (D-blade). Each element includes a cluster fabric interface module adapted to implement a network protocol that enables intra-cluster communication among the elements. The network protocol is a multi-layered protocol that integrates a session infrastructure and an application operation set into a session layer that obviates encapsulation and buffering overhead typically associated with protocol layering. The network protocol is illustratively a request/response protocol wherein an element (requester) receiving a data access request from a client redirects that request to another element (responder) that services the request and, upon completion, returns a response.

All network protocol communication in the cluster occurs via connections, which to provide a network transport for sessions between the requesters/responders. At least one connection is required for each session, wherein the connection is used for both requests and responses. Each request/response is embodied as an RPC that is transmitted over one of the connections. Each RPC comprises a header and a set of procedure specific parameters. For network protocol RPCs, the procedure specific parameters include a control portion and the data associated with the RPC.

In one illustrative embodiment of the invention, one or more block checksums are generated in the control portion of the RPC. These block checksums may be quickly computed using conventional data checksumming procedures for the data contained within the RPC. In addition, block sizes of the checksums are illustratively selected so that the checksum may be utilized at multiple stages of processing. For example, assume a file system executing on the D-blade utilizes 4 kilobyte (KB) blocks for internal operations and for writing to disk. Accordingly, the block size for the block checksums may be selected as 4 KB in size. This permits the use of the checksum for end-to-end data protection, e.g., from N-blade to D-blade to disk or vice versa.

According to the invention, the block checksum(s) of the data portion that is stored in the control portion of the RPC are hashed and the resulting hash value encrypted to generate the message integrity check. This aspect of the invention contemplates use of a strong data checksum, such as the well-known MD-5, to provide a high confidence that the transmitted data is valid without checksumming the same data twice, as is required in prior GSS-API levels of security. It is noted that a block checksum may not be removed without detection; accordingly, by utilizing a sufficiently secure checksumming algorithm, an attacker would be required to modify the data in a way that does not modify the block checksum.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Cluster Environment

Figure 1:
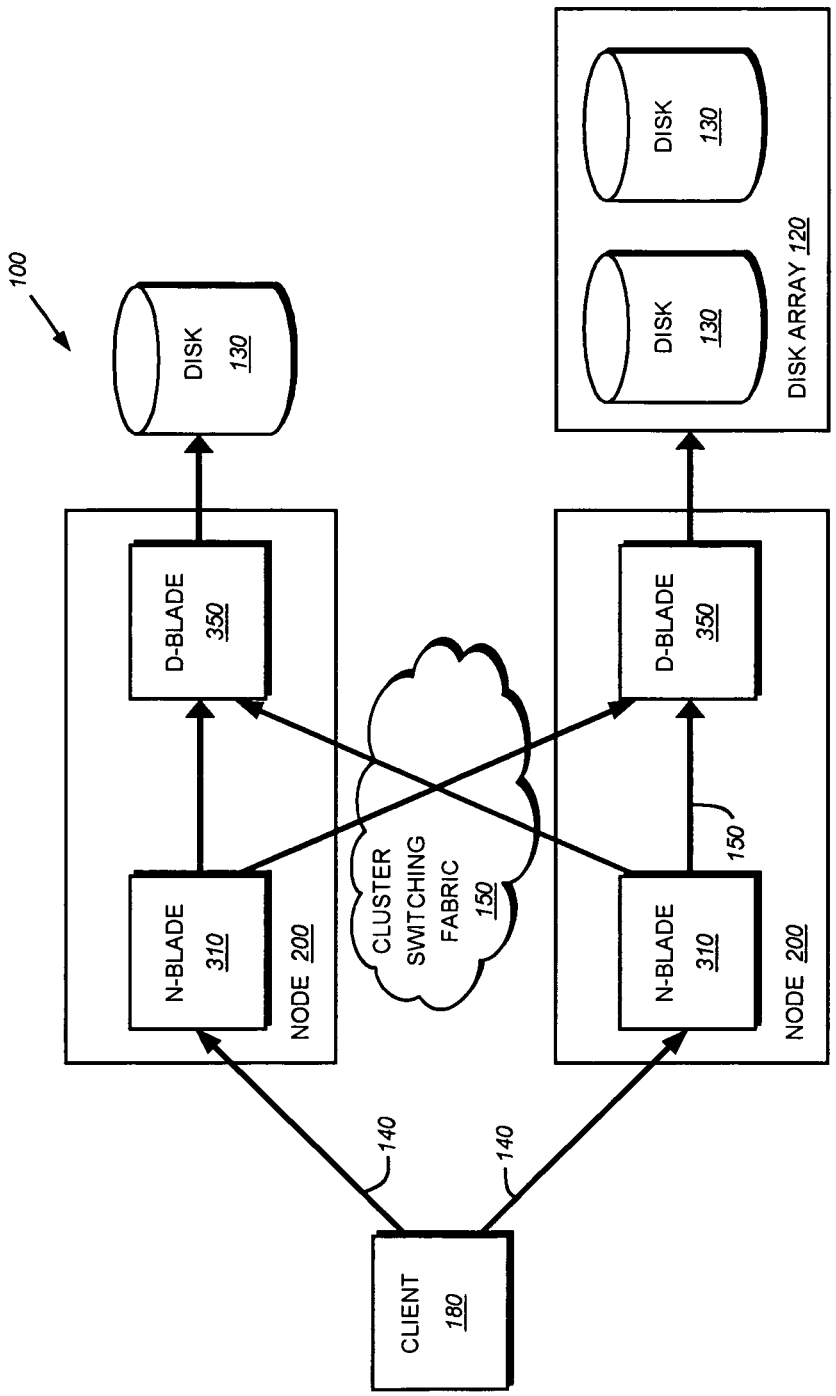
FIG. 1 is a schematic block diagram of a plurality of nodes interconnected as a cluster in accordance with an embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-blade 310) and a disk element (D-blade 350). The N-blade 310 includes functionality that enables the node 200 to connect to clients 180 over a computer network 140, while each D-blade 350 connects to one or more storage devices, such as disks 130 of a disk array 120. The nodes 200 are interconnected by a cluster switching fabric 150 which, in the illustrative embodiment, may be embodied as a Gigabit Ethernet switch. An exemplary distributed file system architecture is generally described in U.S. Patent Application Publication No. US 2002/0116593 titled METHOD AND SYSTEM FOR RESPONDING TO FILE SYSTEM REQUESTS, by M. Kazar et al. published Aug. 22, 2002. It should be noted that while there is shown an equal number of N and D-blades in the illustrative cluster 100, there may be differing numbers of N and/or D-blades in accordance with various embodiments of the present invention. For example, there may be a plurality of N-blades and/or D-blades interconnected in a cluster configuration 100 that does not reflect a oneto-one correspondence between the N and D-blades. As such, the description of a node 200 comprising one N-blade and one D-blade should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

B. Storage System Node

Figure 2:
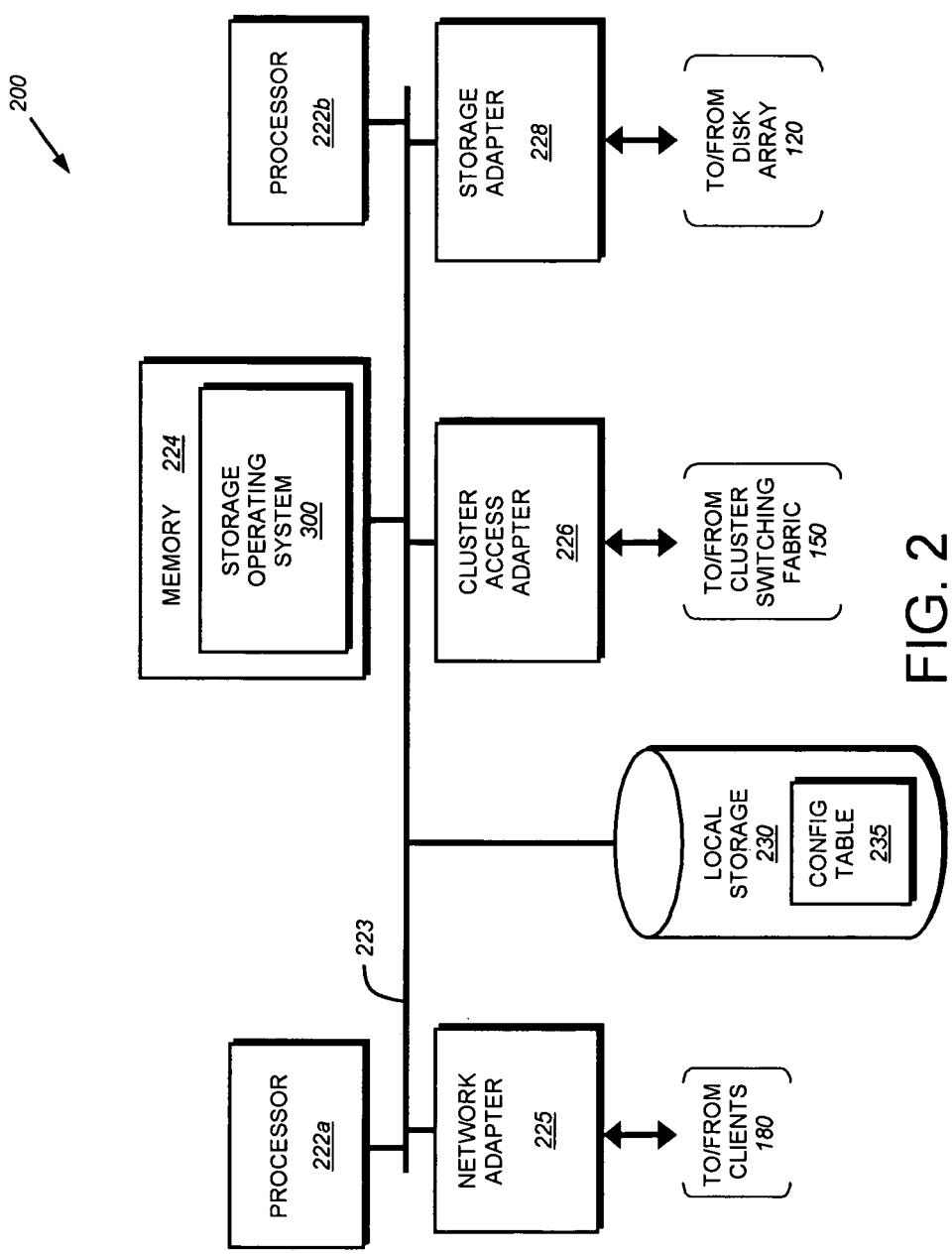
FIG. 2 is a schematic block diagram of a node in accordance with an embodiment of the present invention.

FIG. 2 is a schematic block diagram of a node 200 that is illustratively embodied as a storage system comprising a plurality of processors 222a,b, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235) provided by one or more management processes that execute as user mode applications. The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-blades and D-blades are implemented on separate storage systems or computers, the cluster access adapter 226 is utilized by the N/D-blade for communicating with other N/D-blades in the cluster 100.

Each node 200 is illustratively embodied as a dual processor storage system executing a storage operating system 300 that preferably implements a high-level module, such as a file system, to logically organize the information as a hierarchical structure of named directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-blade 310 on the node, while the other processor 222b executes the functions of the D-blade 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, microelectro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 3:
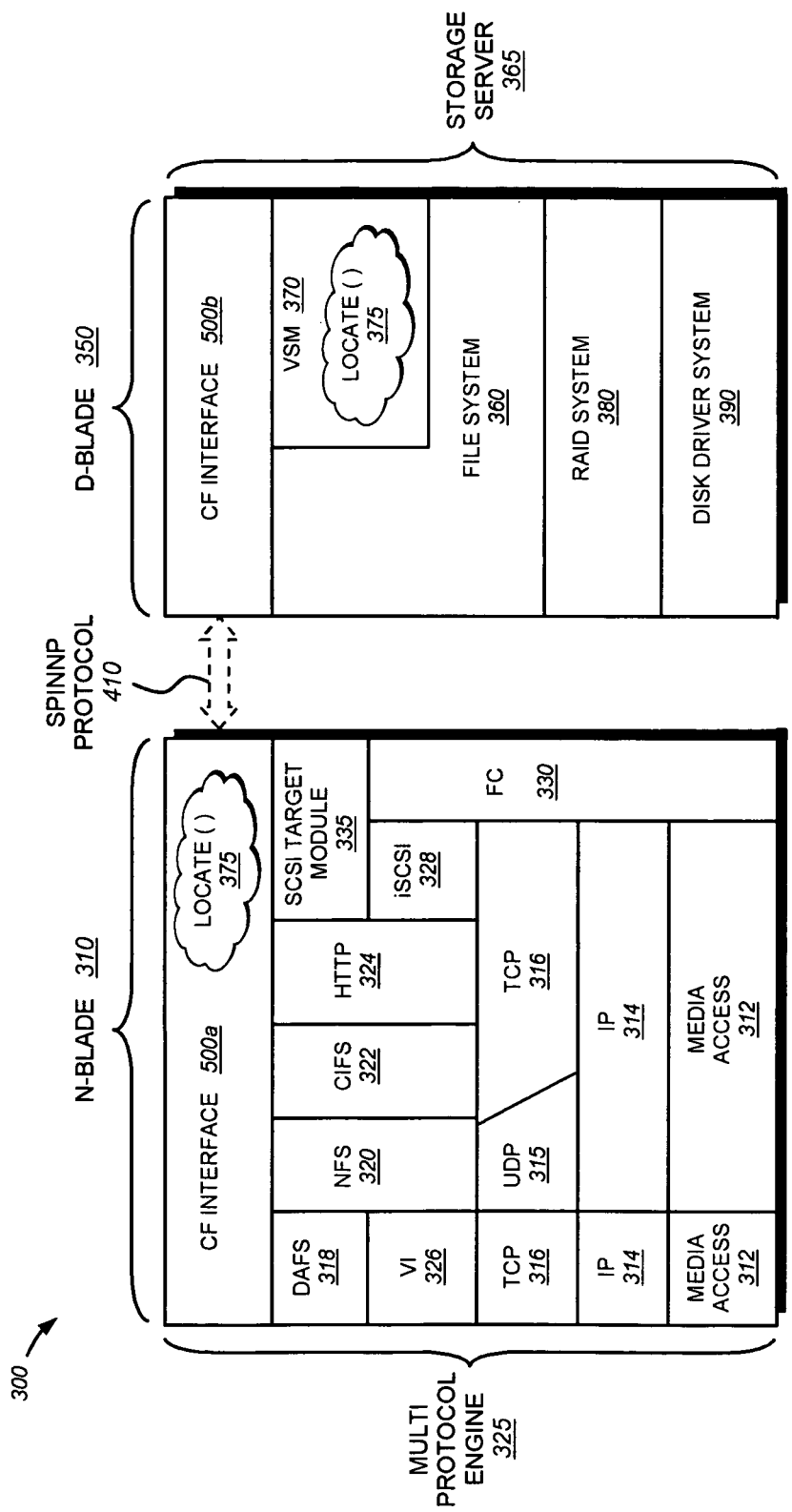
FIG. 3 is a schematic block diagram of a storage operating system that may be advantageously used with the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) is protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSIspecific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360 in cooperating relation with a volume striping module (VSM) 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol. The VSM 370 illustratively implements a striped volume set (SVS) and cooperates with the file system 360 to enable storage server 365 to service a volume of the SVS. In particular, the VSM 370 implements a Locate( ) function 375 to compute the location of data container content in the SVS volume to thereby ensure consistency of such content served by the cluster.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework (not shown), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store meta-data describing the layout of its file system; these meta-data files include, among others, an mode file. A file handle, i.e., an identifier that includes an Mode number, is used to retrieve an Mode from disk.

Broadly stated, all Modes of the write-anywhere file system are organized into the mode file. A file system (fs) info block specifies the layout of information in the file system and includes an Mode of a file that includes all other modes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. SpinNP Network Protocol

In the illustrative embodiment, the storage server 365 is embodied as D-blade 350 of the storage operating system 300 to service one or more volumes of array 120. In addition, the multi-protocol engine 325 is embodied as N-blade 310 to (i) perform protocol termination with respect to a client issuing incoming data access request packets over the network 140, as well as (ii) redirect those data access requests to any storage server 365 of the cluster 100. Moreover, the N-blade 310 and D-blade 350 cooperate to provide a highly-scalable, distributed storage system architecture of the cluster 100. To that end, each blade includes a cluster fabric (CF) interface module 500a,b adapted to implement a network protocol that enables intra-cluster communication among the blades, as described herein.

The protocol layers, e.g., the NFS/CIFS layers and the iSCSI/FC layers, of the N-blade 310 function as protocol servers that translate file-based and block based data access requests from clients into network protocol messages used for communication with the D-blade 350. That is, the N-blade servers convert the incoming data access requests into primitive operations (commands) that are embedded within messages by the CF interface module 500 for transmission to the D-blades 350 of the cluster 100. Notably, the CF interface modules 500 cooperate to provide a single file system image across all Dblades 350 in the cluster 100. Thus, any network port of an N-blade that receives a client request can access any data container within the single file system image located on any D-blade 350 of the cluster.

Further to the illustrative embodiment, the N-blade 310 and D-blade 350 are implemented as separately-scheduled processes of storage operating system 300; however, in an alternate embodiment, the blades may be implemented as pieces of code within a single operating system process. Communication between an N-blade and D-blade is thus illustratively effected through the use of message passing between the blades although, in the case of remote communication between an N-blade and D-blade of different nodes, such message passing occurs over the cluster switching fabric 150. A known message-passing mechanism provided by the storage operating system to transfer information between blades (processes) is the Inter Process Communication (IPC) mechanism.

The network protocol illustratively described herein is the Spin network protocol (SpinNP) that comprises a collection of methods/functions constituting a SpinNP application programming interface (API). The SpinNP API, in this context, is a set of software calls and routines that are made available (exported) by a process and that can be referenced by other processes. As described herein, all SpinNP protocol communication in the cluster occurs via connections. Communication is illustratively effected by the D-blade exposing the SpinNP API to which an N-blade (or another D-blade) issues calls. To that end, the CF interface module 500 is organized as a CF encoder and CF decoder. The CF encoder of, e.g., CF interface 500a on N-blade 310 encapsulates a SpinNP message as (i) a local procedure call (LPC) when communicating a command to a D-blade 350 residing on the same node 200 or (ii) a remote procedure call (RPC) when communicating the command to a D-blade residing on a remote node of the cluster 100. As used herein, the term RPC shall be taken to mean both LPCs and RPCs. In either case, the CF decoder of CF interface 500b on D-blade 350 de-encapsulates the SpinNP message and processes the command. In accordance with the illustrative embodiment of the present invention, the CF encoder implements that message integrity check of the present invention.

Figure 4:
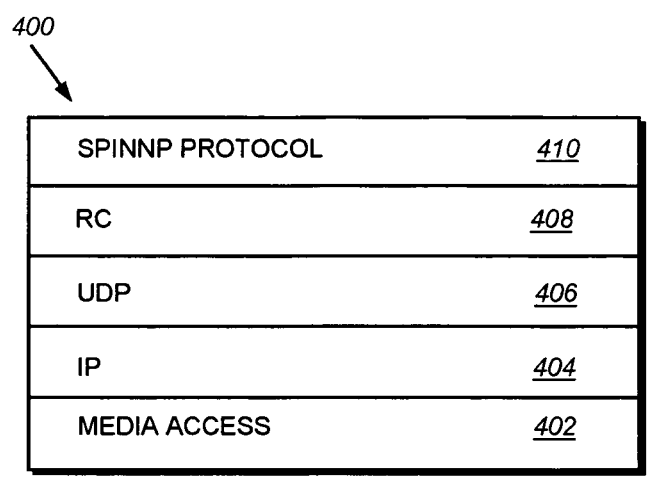
FIG. 4 is a schematic block diagram illustrating the format of a SpinNP message in accordance with an embodiment of with the present invention.

FIG. 4 is a schematic block diagram illustrating the format of a SpinNP message 400 in accordance with an embodiment of with the present invention. The SpinNP message 400 is illustratively used for RPC communication over the switching fabric 150 between remote blades of the cluster 100; however, it should be understood that the term "SpinNP message" may be used generally to refer to LPC and RPC communication between blades of the cluster. The SpinNP message 400 includes a media access layer 402, an IP layer 404, a UDP layer 406, a reliable transport layer, such as a reliable connection (RC) layer 408, and a SpinNP protocol layer 410. As noted, the SpinNP protocol conveys commands related to operations contained within, e.g., client requests to access data containers stored on the cluster 100; the SpinNP protocol layer 410 is that portion of message 400 that carries those commands. Illustratively, the SpinNP protocol is datagram based and, as such, involves transmission of messages or "envelopes" in a reliable manner from a sender (e.g., an N-blade 310) to a receiver (e.g., a D-blade 350). The RC layer 408 implements a reliable transport protocol that is adapted to process such envelopes in accordance with a connectionless protocol, such as UDP 406.

The SpinNP network protocol is illustratively a multi-layered protocol that integrates a session infrastructure and an application operation set into a session layer. The session layer manages the establishment and termination of sessions between blades in the cluster and is illustratively built upon a connection layer that defines a set of functionality or services provided by a connection-oriented protocol. The connection-oriented protocol may include a framing protocol layer over a network transport, such as RC and/or TCP, or a memory-based IPC protocol. These connections are formed via the network transport, or via the local memory-to-memory or adapter-to-memory transport, and provide a packet/message transport service with flow control. It should be noted that other connection-oriented protocols, perhaps over other transports, can be used, as long as those transports provide the same minimum guaranteed functionality, e.g., reliable message delivery.

Figure 5:
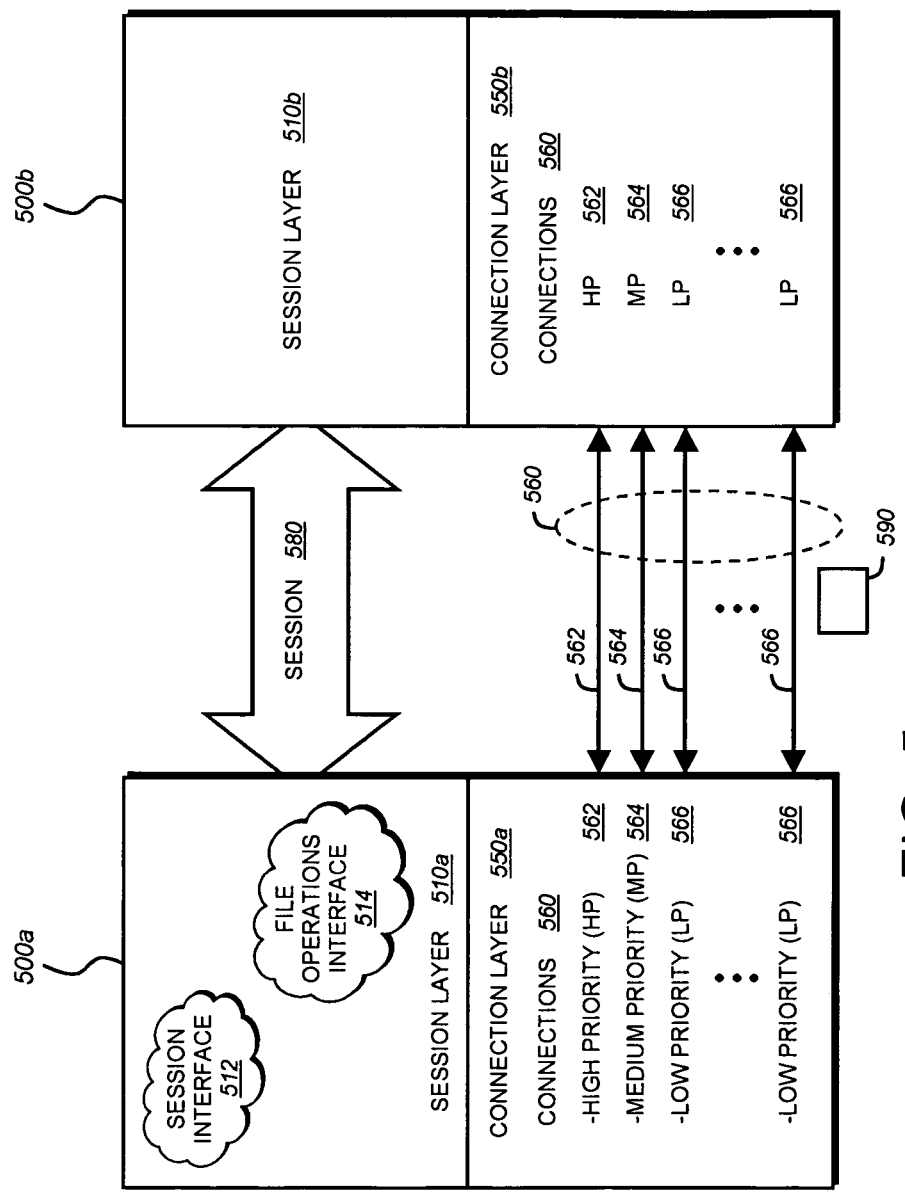
FIG. 5 is a schematic block diagram illustrating the organization of cluster fabric interface modules adapted to implement a SpinNP protocol in accordance with the present invention.

The SpinNP network protocol is illustratively a request/response protocol wherein to a blade (requester) receiving a data access request from a client redirects that request to another blade (responder) that services the request and, upon completion, returns a response. The network protocol is illustratively implemented by the CF interface modules 500 and, as such, a SpinNP session provides a context for the flow of request messages (requests) and a reverse direction flow of corresponding response messages (responses) to those requests. Each request consists of one SpinNP message and generates one response, unless the connection is lost or the session terminates abnormally. FIG. 5 is a schematic block diagram illustrating the organization of the CF interface modules 500a,b adapted to implement the SpinNP protocol in accordance with the present invention. Each module 500a,b comprises a SpinNP session layer 510a,b and a connection layer 550a,b.

As noted, the SpinNP network protocol 410 relies on connections for reliable message delivery. As such, a session 580 is disposed over one or more connections 560 and is illustratively established between a pair of blades or other participants. For example, a session can be established between D-blades, between an N-blade and a D-blade, and between N-blades (if there proves to be a need for N-blade-to-N-blade SpinNP calls). The session can also be used to inter-connect other entities or agents, including userspace processes and services, to blades or to each other. Each pair of blades typically requires only one session to communicate; however, multiple sessions can be opened simultaneously between the same pair of blades. Each session requires bi-directional request flow over the same connection. The session 580 also provides an infrastructure that makes messages secure and supports recovery without requiring an additional protocol layer between the network transport layer (RC or TCP) and the application layer (e.g., file access operations). Each session is independently negotiated and initiated to thereby enable a high level of message concurrency and asynchrony.

The connections 560 are established by the connection layers 510a,b and provide the network transport for the sessions between the blades. At least one connection is required for each session, wherein the connection is used for both requests and responses. Although more than one connection can be bound to a session, only connections that are bound to the session can be used to carry the requests and responses for that session. The connections 560 are bi-directional, allowing message flow in each direction. For example, requests flow in both directions on each session, thereby allowing forward (operational) and reverse (callback) flows to be sent through the same session. Responses for both directions of request flow are also carried in the session. Connections that are bound to sessions cannot be shared by multiple sessions; however, multiple sessions may be is multiplexed onto a single connection. That is, operational and callback sessions between an N-blade/D-blade pair can be multiplexed onto a single connection. Sessions can also multiplex operations for different clients and different users.

Each session 580 is illustratively identified by a globally unique identifier (id) formed of the universal unique ids (UUIDs) of its two participant blades, with the session initiator's UUID listed first. The globally unique id is combined with a 64-bit uniquifier that is unique for all concurrent sessions between the pair of blades, regardless of which blade is the initiator, as well as for any dormant recoverable session for which any state is still stored on either of the two blades. The uniquifier may be generated using the current time, indicating the time of constructing a session initiation operation, i.e., CREATE_SESSION, conveyed within an appropriate request. The resulting session id uniquifier is then confirmed to be unique by the receiver blade. Note that the id uniquifier should be unique unless both blades are trying to create a session to each other simultaneously. If so, each blade can counter-propose a different session id, possibly by simply adding a small random number to the original proposed session id uniquifier.

Illustratively, GSS security is performed on a per session basis. During session initialization, a secure GSS-API key exchange is performed. The exchanged keys are utilized for subsequent encryption of a message integrity check, described further below. It should be noted that while, in the illustrative embodiment, the participants to a GSS security session are the blades of a node, the principles of the present invention may be utilized in other contexts. As such, the use of the message integrity check between blades of a node should be taken as exemplary only.

E. Message Integrity Check

The present invention is directed to a system and method for generating a message integrity check for use in data transmissions, including, e.g., RPC-based network protocols executing on nodes of a cluster. All network protocol communication in the cluster occurs via connections, which provide a network transport for sessions between the requesters/responders. At least one connection is required for each session, wherein the connection is used for both requests and responses. Each request/response is embodied as a RPC that is transmitted over one of the connections. Each RPC comprises a header and a set of procedure specific parameters. For network protocol RPCs, the procedure specific parameters include a control portion and the data associated with the RPC.

In the illustrative embodiment of the invention, one or more block checksums are generated in the control portion of the RPC. These block checksums may be quickly computed using conventional data checksumming procedures for the data contained within the RPC. In addition, block sizes of the checksums are illustratively selected so that the checksum may be utilized at multiple stages of processing. For example, assume a file system executing on the D-blade utilizes 4 kilobyte (KB) blocks for internal operations and for writing to disk. Accordingly, the block size for the block checksums may be selected as 4 KB in size. This permits the use of the checksum for end-to-end data protection, e.g., from N-blade to D-blade to disk or vice versa. It should be noted that the block checksum(s) would typically be computed by either the sender and/or recipient.

According to one embodiment of the invention, the block checksum(s) of the control portion of the RPC are hashed and the resulting hash value encrypted to generate the message integrity check. This aspect of the invention contemplates use of a strong data checksum, such as the well-known MD-5, to provide a high confidence that the transmitted data is valid without checksumming the same data twice. It is noted that a block checksum may not be removed without detection; accordingly, an attacker would only be able to modify the data in a way that does not modify the block checksum. By using a sufficiently strong hashing algorithm, the probability of successfully modifying the data while maintaining the proper checksum is greatly reduced.

Figure 6:
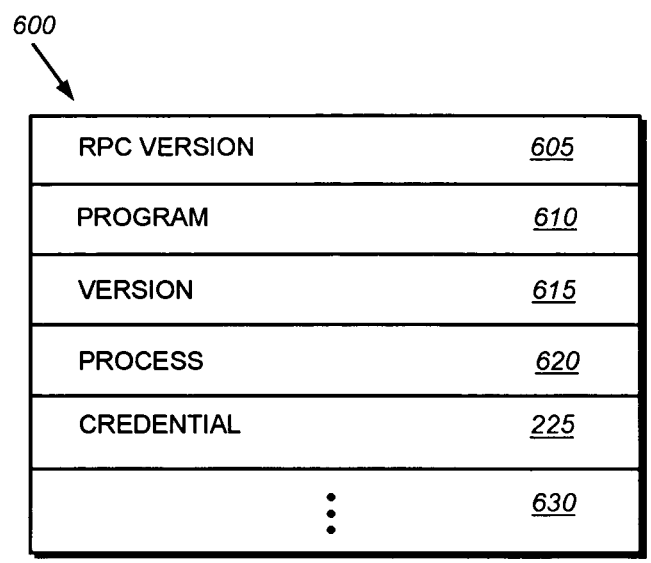
FIG. 6 is a schematic block diagram of an exemplary remote procedure call header in accordance with an embodiment of the present invention.

FIG. 6 is a schematic block diagram of an exemplary RPC header data structure 600 as described in the above-incorporated *RPC: Remote Procedure Call Specification Version* 2. The RPC header data structure 600 includes a RPC version field 605, a program field 610, a version field 615, a process field 620, a credential field 625 and, in alternate embodiments, additional fields 630. The RPC version field 605 identifies the version of the RPC specification used within the RPC. The program field 610 identifies the program originating the RPC, whereas the version field 615 identifies the version of the program identified in the program field 610. The process field 620 identifies the process to be performed by the RPC and the credential field 625 contains an authentication credential for the RPC.

Figure 7:
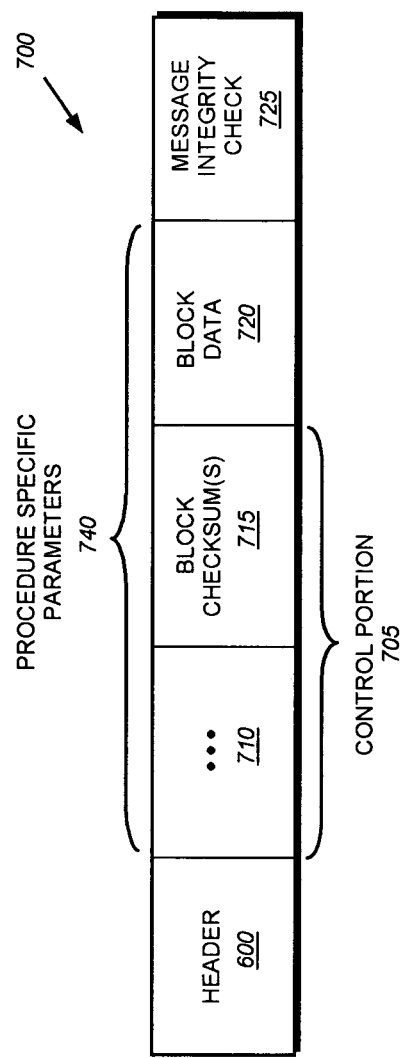
FIG. 7 is a schematic block diagram of an exemplary message integrity check protected remote procedure call in accordance with an embodiment of the present invention.

FIG. 7 is a schematic block diagram of an exemplary RPC data structure 900 showing an RPC protected using the message integrity check of the present invention. The RPC data structure 700 includes a RPC header data structure 600, a set of procedure specific parameters 740 and the novel message integrity check 725. The procedure specific parameters 740 include a control portion 705 and a set of data 720. The control portion 705 includes one or more block checksums 715 and additional operation specific fields 710. In accordance with the illustrative embodiment of the present invention, the block checksum(s) 715 is hashed along with the other control and header portions of the message to be integrity protected and the resulting value encrypted to form the message integrity check 725. As the block checksum(s) may not be removed or modified without detection, the data itself may only be modified in ways that do not change the block checksum. Using a sufficiently strong data checksum technique, such as MD-5, makes it highly improbable that an attacker could maliciously modify the data and still produce the proper block checksum and message integrity check.

Figure 8:
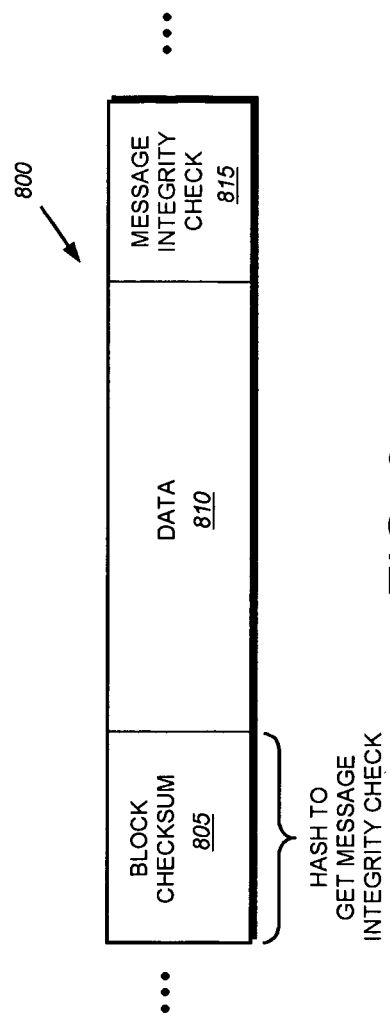
FIG. 8 is a schematic block diagram of an exemplary message integrity check protected data transmission in accordance with an embodiment of the present invention.

FIG. 8 is a schematic block diagram of an exemplary data transmission 800 protested by the message integrity check of the present invention. The data transmission 800 comprises one or more block checksums 805, data 810 and the novel message integrity check 815. The block checksum(s) 805 are computed of the data 810. In accordance with the present invention, the block checksum(s) is then hashed to obtain the message integrity check 815. Illustratively, the data transmission may be a single element of a data to stream. Or may comprise any other form of data transmission that incorporates a block checksum.

Figure 9:
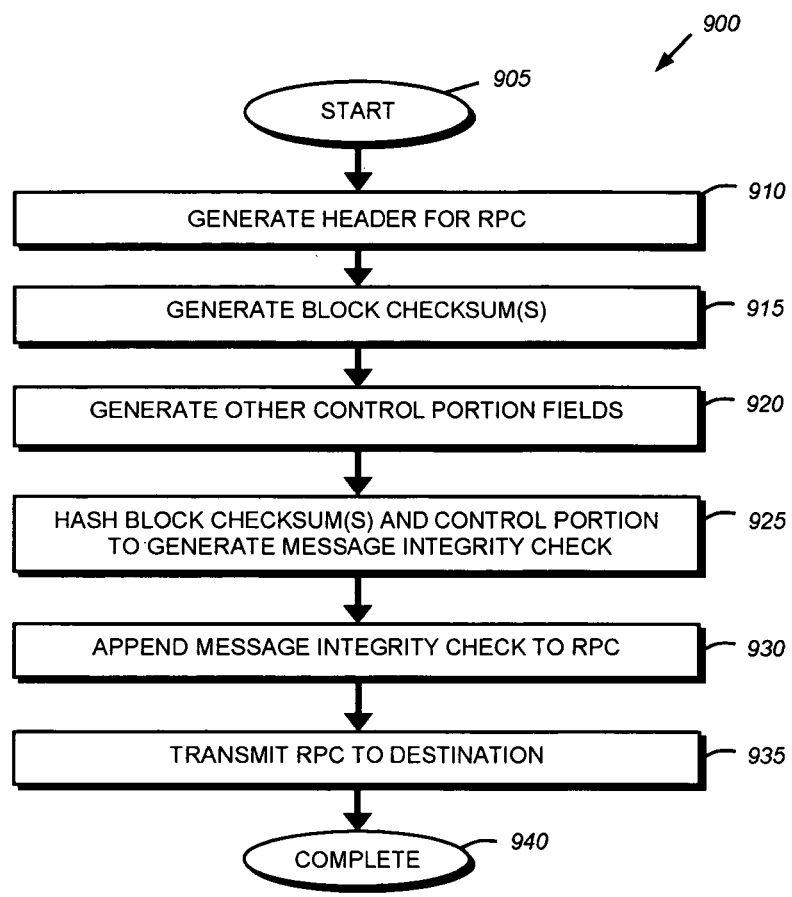
FIG. 9 is a flowchart detailing the steps of a procedure for preparing a message integrity check protected remote procedure call in accordance with an embodiment of the present invention.

FIG. 9 is a flowchart detailing the steps of procedure 1000 for generating a message integrity check in accordance with an embodiment of the present invention. The procedure 900 begins in step 905 and continues to step 910 where the RPC header is generated by the session layer 510. Illustratively, GSS security is associated with a particular session 580; however in alternate embodiments, GSS security may be associated with individual users and/or nodes. As such the description of GSS associated with a session should be taken as exemplary only. In step 915 the data is checksummed using the appropriate checksumming algorithm to generate the block checksums. As noted above, it is advantageous to checksum in block sizes that are used throughout the data pathways to prevent the need for checksumming the data twice (or more). In step 920, the other fields of the control portion are generated. The message integrity check is then generated in step 925 by hashing the block checksum(s) and control portion and then encrypting the resulting hash values. In step 930, the message integrity check is appended to the RPC data structure before the RPC is transmitted to the destination in step 935. The procedure then completes in step 940.

Figure 10:
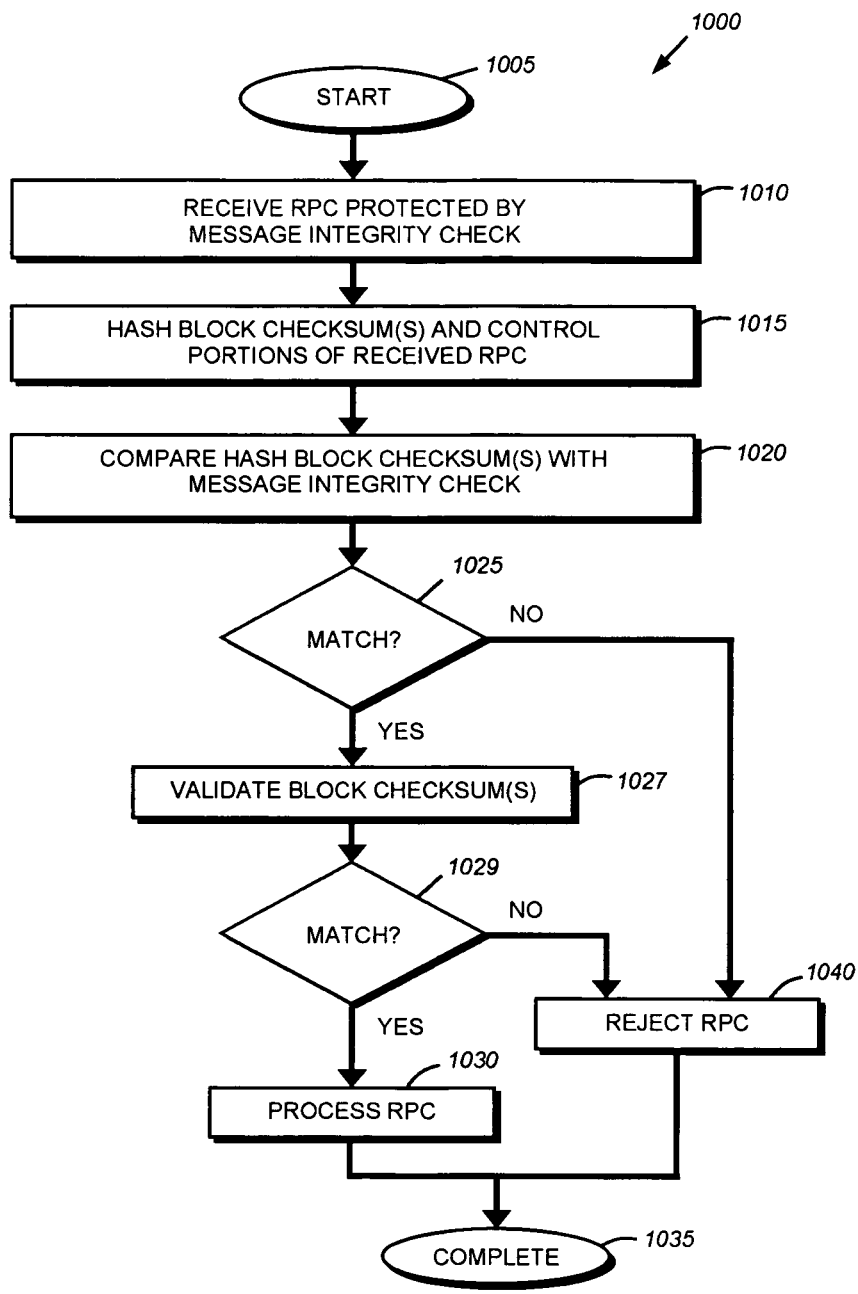
FIG. 10 is a flowchart detailing the steps of a procedure for processing a message integrity check protected remote procedure call in accordance with an embodiment of the present invention

FIG. 10 is a flowchart detailing the steps of a procedure for processing a received RPC that is protected with a message integrity check of the present invention. The procedure 1000 begins in step 1005 and continues to step 1010 where an RPC that is protected by a message integrity check is received by, e.g., a CF decoder. In step 1015, the CF decoder hashes the block checksum(s) of the received RPC and encrypts the resulting value. The resulting encrypted value is compared with the received message integrity check in step 1020 and, in step 1025, a determination is made as to whether there is a match. If so, the procedure continues to step 1027 where the block checksum(s) are validated against the stored data by, e.g., recomputing the checksum(s) using the received data. In step 1029, a determination is made whether the block checksum(s) match. If so, the procedure continues to step 1030 where the operation contained within the RPC is processed before the procedure completes in step 1035. However, if there is no match, the procedure branches to step 1040 where the RPC is rejected. It should be noted that the block checksums may also be utilized for storing the data on storage devices, such as disks.

Advantageously, use of a hash of the block checksum preserves the integrity of the data within the protocol specific parameters of a RPC. An attempt to compromise the integrity of the data by, e.g., a network attacker, would require modifying the data in a meaningful way that does not modify the block checksum. As noted above, the use of a sufficiently strong hashing algorithm provides a high degree of security by rendering it highly improbable that an attacker could succeed in modifying the data while maintaining the proper block checksum. Additionally, it is highly improbable that the checksums could be removed or modified without detection via the message integrity check.

It is important to note that the system would typically compute the block checksum even if the present invention was not utilized. As such, the added computations to hash the block checksums is minimal compared to the processing required to hash the data to generate the block checksums. Thus, the message integrity check of the present invention may be utilized with any data transmission, including, RPCs, data streams, file-level protocols, etc. To compute the message integrity check of the data transmission, one only needs to compute the message integrity of the block checksums and any header information, which may be performed substantially faster than conventional Integrity verification.

The foregoing description has been directed to particular embodiments of this invention. It will be apparent, however, that other variations and modifications may be made to the described embodiments, with the attainment of some or all of their advantages. The present invention may be applied to any wire protocol or other form of data transmission. While the present invention has been written in terms of protection of file protocols or RPCs, the teachings of the present invention may be applied to any form of data transmission that includes block checksums. Additionally, the procedures, processes, layers and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for generating a message integrity check for a data transmission between a plurality of nodes of a cluster, the method comprising:
   generating a single remote procedure call (RPC) data structure at a source node of the cluster to transmit data of the data transmission, wherein each node includes a memory and processor and wherein requests and responses between the nodes include RPC data structures;
   computing one or more block checksums from the data of the data transmission to be included in the single RPC data structure;
   hashing the computed one or more block checksums in the single RPC data structure to generate a hash value;
   encrypting the hash value to generate the message integrity check;
   appending the message integrity check to the single RPC data structure, wherein the single RPC data structure includes a header section, a control portion maintaining the one or more block checksums, a data section maintaining the data, and a message integrity section maintaining the message integrity check; and
   transmitting, over a computer network, the single RPC data structure To a destination node of the cluster of the plurality of nodes, wherein the destination node processes an operation contained within the control portion of the single RPC data structure based on a second message integrity check computed by the destination node and associated with the RPC data structure matching the message integrity check appended to the RPC data structure.

2. The method of claim 1 wherein each node includes a network element and a disk element.

3. The method of claim 1 further comprising:
   receiving, at the destination node, the single RPC data structure;
   hashing the one or more block checksums to generate a second hash value;
   encrypting the second hash value to form the second message integrity check; and
   comparing the message integrity check appended to the RPC data structure with the second message integrity check.

4. The method of claim 3 further comprising:
   rejecting, in response to determining that the second message integrity check is not identical to the message integrity check appended to the RPC data structure, the operation contained within the control portion of the single RPC data structure.

5. The method of claim 1 wherein computing the one or more block checksums from the data of the data transmission utilizes a MD-5 hashing algorithm.

6. The method of claim 1 wherein the one or more block checksums are computed on a specified block size of the data.

7. The method of claim 1 wherein the single RPC data structure comprises a data stream.

8. The method of claim 1 wherein the single RPC data structure comprises a file-level protocol.

9. The method of claim 1 wherein the one or more block checksums are utilized to perform a subsequent validation of the data.

10. The method of claim 9 wherein the subsequent validation occurs when the data is read from a storage device after being previously written to the storage device with the one or more block checksums.

11. A system, comprising:
    one or more network elements and one or more disk elements organized as a cluster; and
    a cluster fabric module of each of the network and the disk elements configured to:
       send requests and responses that include remote procedure call (RPC) data structures,
       generate a single RPC data structure to transmit data to a destination element,
       compute one or more block checksums of from data in a data transmission of the single RPC data structure to be included in the single RPC data structure,
       hash the computed one or more block checksums to generate a hash value,
       encrypt the hash value to generate a message integrity check,
       append the message integrity check to the single RPC data structure, and
       transmit, over a computer network, the single RPC data structure including the one or more block checksums and the data, with the appended integrity check, to the destination element wherein the destination element processes an operation contained within the single RPC data structure based on a is second integrity check computed by the destination element matching the message integrity check appended to the RPC data structure.

12. The system of claim 11 wherein the single RPC data structure comprises a data stream.

13. The system of claim 11 wherein the single RPC data structure comprises a file-level protocol.

14. The system of claim 11 wherein the one or more block checksums are utilized to perform a subsequent validation of the data.

15. The system of claim 14 wherein the subsequent validation occurs when the data is read from a storage device after being previously written to the storage device with the one or more block checksums.

16. A system for generating a message integrity check for a data transmission between a plurality of nodes of a cluster, comprising:
    means for generating a single remote procedure call (RPC) data structure at a source node of the cluster, to transmit data of the data transmission, wherein each node comprises a memory and processor and wherein requests and responses between the nodes include RPC data structures;
    means for computing one or more block checksums of from the data in the data transmission to be included in the sing RPC data structure;
    means for hashing the computed one or more block checksums in the single RPC data structure to generate a hash value;
    means for encrypting the hash value to generate the message integrity check;
    means for appending the message integrity check to the single RPC data structure,
    wherein the single RPC data structure includes a header section, a control portion maintaining the one or more block checksums, a data section maintaining the data, and a message integrity section maintaining the message integrity check; and
       means for transmitting, over a computer network, the single RPC data structure to a destination node of the cluster of the plurality of nodes, wherein the destination node processes an operation contained within the control portion of the single RPC data structure based on a second message integrity check computed by the destination node and associated with the RPC data structure matching the message integrity check appended to the RPC data structure.

17. The system of claim 16 wherein the single RPC data structure comprises a data stream.

18. The system of claim 16 wherein the single RPC data structure comprises a file-level protocol.

19. The system of claim 16 wherein the one or more block checksums are utilized to perform a subsequent validation of the data.

20. The system of claim 19 wherein the subsequent validation occurs when the data is read from a storage device after being previously written to the storage device with the one or more block checksums.

21. A computer readable medium for containing executable program instructions executed by a processor, comprising:

program instructions that generate a single remote procedure call (RPC) data structure for a source node of a cluster of a plurality of nodes, to transmit data of a data transmission, wherein each node comprises a memory and processor and wherein requests and responses between the nodes include RPC data structures;

program instructions that compute one or more block checksums of from the data in the data transmission to be included in the RPC data structure;

program instructions that hash the computed one or more block checksums in the single RPC data structure to generate a hash value;

program instructions that encrypt the hash value to generate the message integrity check;

program instructions that append the message integrity check to the single RPC data structure, wherein the single RPC data structure includes a header section, a control portion maintaining the one or more block checksums, a data section maintaining the data, and a message integrity section maintaining the message integrity check; and program instructions that transmit, over a computer network, the single RPC data structure, to a destination node of the cluster of the plurality of nodes, wherein the destination node processes an operation contained within the control portion of the single RPC data structure in response to the destination node determining a second message integrity check associated with the RPC data structure and calculated by the destination node is identical to the message integrity check.

\* \* \* \* \*

UNITED STATES PATENT AND TRADEMARK OFFICE
CERTIFICATE OF CORRECTION

PATENT NO.         : 8,627,071 B1                                                Page 1 of 3
APPLICATION NO.    : 11/118665
DATED              : January 7, 2014
INVENTOR(S)        : Peter F. Corbett It is certified that error appears in the above-identified patent and that said Letters Patent is hereby corrected as shown below:

In the Specification:
Col. 1, line 18:
~~organizes the system to by, inter alia, invoking storage opera-~~ should read
organizes the system by, inter alia, invoking storage opera Col. 1, line 60:
~~space, wherein pieces of code within the process is provide~~ should read
space, wherein pieces of code within the process provide Col. 2, line 67:
~~porated by reference, is to typically employed. The RPC-~~ should read
porated by reference, is typically employed. The RPC- Col. 3, line 41:
~~via connections, which to provide a network transport for~~ should read
via connections, which provide a network transport for Col. 5, line 10:
~~figuration 100 that does not reflect a oneto-one correspon-~~ should read
figuration 100 that does not reflect a one-to-one correspon- Col. 5, line 59:
~~or more than two processor system. Illustratively, one pro-~~ should read
or more than two processor system. Illustratively, one pro- Col. 7, line 30:
~~tocol 322 and the Hypertext Transfer Protocol (HTTP) is~~ should read
tocol 322 and the Hypertext Transfer Protocol (HTTP)

Signed and Sealed this
Eleventh Day of March, 2014

Michelle K. Lee
*Deputy Director of the United States Patent and Trademark Office*

CERTIFICATE OF CORRECTION (continued)

Col. 7, line 38:
~~specific and iSCSIspecific access control to the blocks and,~~ should read
<u>specific and iSCSI-specific access control to the blocks and,</u>

Col. 8, line 22:
~~meta-data files include, among others, an mode file. A file~~ should read
<u>meta-data files include, among others, an inode file. A file</u>

Col. 8, line 23:
~~handle, i.e., an identifier that includes an Mode number, is~~ should read
<u>handle, i.e., an identifier that includes an inode number, is</u>

Col. 8, line 24:
~~used to retrieve an Mode from disk.~~ should read
<u>used to retrieve an inode from disk.</u>

Col. 8, line 25:
~~Broadly stated, all Modes of the write-anywhere file sys-~~ should read
<u>Broadly stated, all inodes of the write-anywhere file sys-</u>

Col. 8, line 26:
~~tem are organized into the mode file. A file system (fs) info~~ should read
<u>tem are organized into the inode file. A file system (fs) info</u>

Col. 8, line 28:
~~includes an Mode of a file that includes all other modes of the~~ should read
<u>includes an inode of a file that includes all other inodes of the</u>

Col. 8, line 43:
~~layer for additional processing prior to to forwarding to the~~ should read
<u>layer for additional processing prior to forwarding to the</u>

Col. 9, line 64:
~~across all Dblades 350 in the cluster 100. Thus, any network~~ should read
<u>across all D-blades 350 in the cluster 100. Thus, any network</u>

Col. 11, line 12:
~~response protocol wherein to a blade (requester) receiving a~~ should read
<u>response protocol wherein a blade (requester) receiving a</u>

Col. 11, line 37:
~~other entities or agents, including userspace processes and~~ should read
<u>other entities or agents, including user-space processes and</u>

CERTIFICATE OF CORRECTION (continued)
U.S. Pat. No. 8,627,071 B1

Col. 11, line 63:
~~however, multiple sessions may be is multiplexed onto a~~ should read
however, multiple sessions may be multiplexed onto a Col. 13, line 40:
~~transmission 800 protested by the message integrity check of~~ should read
transmission 800 protected by the message integrity check of In the Claims:
Claim 11, col. 16, line 9:
~~compute one or more block checksums of from data in a~~ should read
compute one or more block checksums from data in a Claim 11, col. 16, line 23:
~~RPC data structure based on a is second integrity~~ should read
RPC data structure based on a second integrity Claim 16, col. 16, line 47:
~~means for computing one or more block checksums of~~ should read
means for computing one or more block checksums Claim 21, col. 18, line 2:
~~checksums of from the data in the data transmission to be~~ should read
checksums from the data in the data transmission to be